United States Patent
Nozaki

[11] Patent Number: 5,366,267
[45] Date of Patent: Nov. 22, 1994

[54] WEATHER STRIP FOR MOTOR VEHICLE

[75] Inventor: Masahiro Nozaki, Ama, Japan

[73] Assignee: Toyoda Gosei Co., Ltd., Nishikasugai, Japan

[21] Appl. No.: 175,680

[22] Filed: Dec. 30, 1993

Related U.S. Application Data

[63] Continuation of Ser. No. 73,618, Jun. 8, 1993, abandoned, which is a continuation of Ser. No. 780,846, Oct. 23, 1991, abandoned, which is a continuation-in-part of Ser. No. 595,820, Oct. 10, 1990, abandoned.

[30] Foreign Application Priority Data

Oct. 11, 1989 [JP] Japan .............. 1-118834[U]

[51] Int. Cl.⁵ .................................... B60J 10/12
[52] U.S. Cl. .................... 296/216; 49/476.1; 49/482.1
[58] Field of Search ............. 296/216, 221–223; 49/475.1, 476.1, 482.1, 490.1, 495.1, 498.1

[56] References Cited

U.S. PATENT DOCUMENTS

| | | | |
|---|---|---|---|
| 2,857,588 | 10/1958 | Korol | 49/495 X |
| 3,250,040 | 5/1966 | Squires | 49/482 |
| 4,243,261 | 1/1981 | Trenkler | 296/213 |
| 4,676,546 | 6/1987 | Igel | 296/217 |
| 4,738,482 | 4/1988 | Bohm et al. | 296/216 |
| 4,765,677 | 8/1988 | Nagata | 296/216 |
| 4,783,117 | 11/1988 | Nagata | 296/216 |
| 4,826,232 | 5/1989 | Wissler | 296/216 |
| 4,892,351 | 1/1990 | Ono et al. | 296/213 |
| 4,925,237 | 5/1990 | Bohn et al. | 296/216 |
| 5,010,691 | 4/1991 | Takahashi | 49/482 |

FOREIGN PATENT DOCUMENTS

| | | | |
|---|---|---|---|
| 1346824 | 11/1963 | France | 296/222 |
| 2341203 | 2/1975 | Germany | 296/216 |
| 56-49622 | 5/1981 | Japan . | |
| 0128022 | 7/1985 | Japan | 296/216 |
| 0206725 | 10/1985 | Japan | 296/216 |
| 64-34328 | 3/1989 | Japan . | |
| 1-306321 | 12/1989 | Japan . | |
| 8601362 | 12/1987 | Netherlands | 296/216 |
| 803141 | 10/1958 | United Kingdom | 49/490 |
| 2036840 | 7/1980 | United Kingdom | 49/498 |

*Primary Examiner*—Dennis H. Pedder
*Attorney, Agent, or Firm*—Cushman Darby & Cushman

[57] ABSTRACT

A weather strip for a sliding sun roof of a motor vehicle has a base portion which is attached to the peripheral edge of the sliding sun roof, and a tubular sealing portion to be contacted with a frame portion defining a roof panel opening when the sliding sun roof is closed. A continuous single lip extends from the tubular sealing portion. A front portion of the continuous single lip, corresponding to a front end of the sliding sun roof, has a predetermined uniform length sufficient for its top end to reach the frame portion, thereby serving as a seal lip. Left and right side portions and a rear portion of the continuous single lip, which respectively correspond to left and right ends and a rear end of the sliding sun roof have a uniform length shorter than that of the front portion thereof, thereby serving as a drip lip. This continuous single lip is made by continuously forming a single lip having a uniform length enough for its top end to reach the frame portion of the roof panel. The lip is provided with a linearly extending thin-walled portion at its mid-length. The drip lip is formed by tearing off a top end portion of the single lip along the thin-walled portion except for the front portion corresponding to the front end of the sliding sun roof which act as a seal lip.

3 Claims, 4 Drawing Sheets

WEATHER STRIP FOR MOTOR VEHICLE

This is a continuation of application Ser. No. 08/073,618, filed on Jun. 8, 1993, now abandoned, which was a continuation of Ser. No. 07/780,846, filed Oct. 23, 1991, now abandoned, which was a CIP of Ser. No. 07/595,820 filed Oct. 10, 1990, now abandoned.

BACKGROUND OF THE INVENTION

1. Field of the Invention

The present invention relates to a weather strip for a motor vehicle, and more particularly to a weather strip to be attached around a sliding sun roof of the motor vehicle.

2. Description of the Prior Art

A sliding sun roof is installed in an opening of a roof panel so as to be slidable backwards and forwards with respect to the motor vehicle. The sliding sun roof is opened by sliding the sun roof backwards and retracting it below the roof panel. The weather strip is attached around the sliding sun roof so as to seal a gap between a peripheral edge of the sliding sun roof and a frame portion of the roof panel opening.

Such a weather strip generally has a downwardly oriented drip lip that extends from its lower portion. This drip lip is meant to guide water leaking through a gap between the weather strip and the frame portion into a drip channel provided in the roof panel so as to be positioned below the drip lip (Japanese unexamined Utility Model publication No. Sho 56-49622).

When the motor vehicle is driven at high speeds, a negative pressure is generated along a surface of the roof panel, thereby causing the sliding sun roof to be drawn outwardly.

Due to this outward force, the sliding sun roof, especially the front portion, is likely to be lifted up. This reduces the sealing force of the weather strip. As a result, air leaks from the inside of the vehicle to the outside thereof, and such an airflow creates an aspiration noise.

In order to prevent this noise generation, conventionally, a seal lip has been formed over the entire length of the weather strip outside the drip lip with the top end of the seal lip being brought into pressurized contact with the frame portion of the roof panel opening (Japanese unexamined Utility Model publication No. Sho 64-34328).

This seal lip acts as a resistive force to the outward drawing force acting on the sliding sun roof. Further, the seal lip prevents the sliding sun roof from being lifted. Even if the sliding sun roof is slightly lifted, the seal lip keeps contact with the frame portion with no reduction in the sealing force thereof.

However, this seal lip also acts to resist the backward and forward sliding movement of the sliding sun roof. Therefore, it has been the custom to cut off the seal lip by means of a cutter or the like, leaving only the front portion corresponding to the front end of the sliding sun roof, which is likely to be lifted up due to the outward force thereon (Japanese unexamined patent publication No. Hei 1-306321).

FIGS. 7 and 8 illustrate examples of the above-described prior art.

FIG. 7 illustrates a cross-section of the weather strip attached to the front end of a sliding sun roof, and FIG. 8 illustrates a corner portion of the weather strip attached to a corner of the sliding sun roof between the front end and the left side thereof.

The weather strip 2 has a drip lip 23 and a seal lip 24, both extending from the lower portion of a tubular sealing portion 22. This seal lip 24 is cut off except for the front portion corresponding to the front end of a sun roof 1 made of a glass plate. Reference numeral 25 (FIG. 8) designates a cut end of the seal lip 24.

In the front end of the sun roof 1, on which the outward force acts to lift up the front end at high motor vehicle speeds, the seal lip 24 comes into pressure contact with a frame portion 41 of a roof panel 4 to maintain an adequate seal and acts to resist lift of the sun roof 1.

In the side edges of the sun roof 1, the seal lip 24 of the weather strip 2 is removed. Accordingly, resistance to the sliding movement of the sliding sun roof is not increased therein.

However, it is extremely difficult to extrude the weather strip having two lips 23, 24 at closed positions while maintaining their precise dimensions. Moreover, it is also difficult work to partially cut off the seal lip 24 after extrusion by means of a cutter or the like. Therefore, the productivity of the prior art is not good.

SUMMARY OF THE INVENTION

It is an object of the present invention to provide a weather strip which prevents a sliding sun roof from being drawn outward when a motor vehicle is driven at high speeds, does not block the backward and forward sliding movement of the sliding sun roof when it is opened and closed, and is easily extruded with improved productivity.

The weather strip of the present invention has a base portion continuously attached to a peripheral edge of a nearly rectangular sliding sun roof, a tubular sealing portion continuously formed onto the periphery of the base portion and in contact with a frame portion of a roof panel when the sliding sun roof is closed, and a lip continuously formed onto the lower portion of the sealing portion and extending therefrom. A front portion of the lip, corresponding to a front end of the sliding sun roof, has a predetermined uniform length that is sufficient for a top end thereof to reach the frame portion, thereby serving as a seal lip that prevents the sliding sun roof from being lifted, and also prevents the generation of aspiration noise. Left and right side portions and a rear portion of the lip, which respectively correspond to left and right ends and a rear end of the sliding sun roof, have a uniform length shorter than that of the front portion thereof, and serves as a drip lip for guiding dripping water into a drip channel.

The above-described lip of the present invention is made by continuously forming a lip having a uniform length so that a top end thereof reaches the frame portion of the roof panel. Further, the lip is provided with a thin-walled portion at about its mid-length on a lower portion of the sealing portion of the weather strip. A top end portion of the lip is torn off along the thin-walled portion except for the front portion of the lip, corresponding to the front end of the sliding sun roof, thereby removing the top end portion of the left and right side portions and the rear portion of the lip.

The weather strip of the present invention has only a continuous single lip, and accordingly can be easily extruded. Moreover, the unnecessary top end portion of the lip can be easily removed by merely tearing it along the thin-walled portion, thereby improving the productivity.

BRIEF DESCRIPTION OF THE DRAWINGS

Other objects, features and characteristics of the present invention, as well as the function of the related elements of the structure, and to the combination of parts and economies of manufacture, will become apparent upon consideration of the following description and the appended claims with reference to the accompanying drawings, all of which form a part of this specification, wherein like reference numerals designate corresponding parts in the figures.

DETAILED DESCRIPTION OF THE EMBODIMENTS

Figure 1:
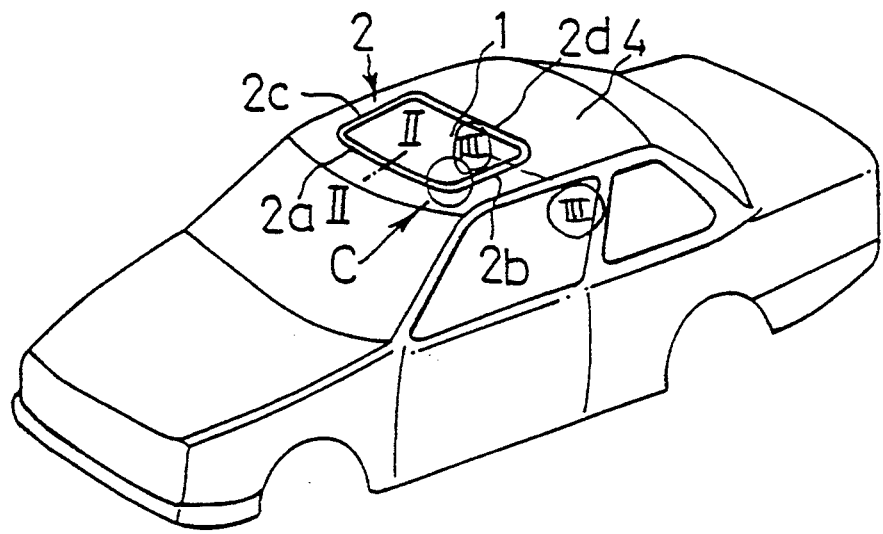
FIG. 1 is a perspective view of a motor vehicle with a first embodiment of a weather strip in accordance with the present invention being attached to a sliding sun roof.
Figure 2:
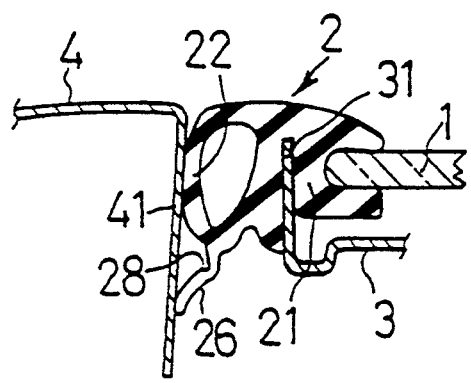
FIG. 2 is a cross-sectional view taken along the line II—II of FIG. 1.

In a first embodiment shown in FIGS. 1 through 4, a weather strip 2 is attached around a nearly rectangular sliding sun roof 1 which opens and closes an opening of a roof panel 4 of a motor vehicle. The weather strip 2 is an extruded body of rubber, and has a base portion 21 which holds a periphery of the sliding sun roof (hereinafter called the sun roof) 1 composed of a glass plate. The base portion 21 is attached to a flange 31 of a sun roof housing 3. A tubular sealing portion 22 is integrally formed onto the outer periphery of the base portion 21, so as to contact a frame portion 41 of the roof panel 4, as shown in FIG. 2.

Figure 3:
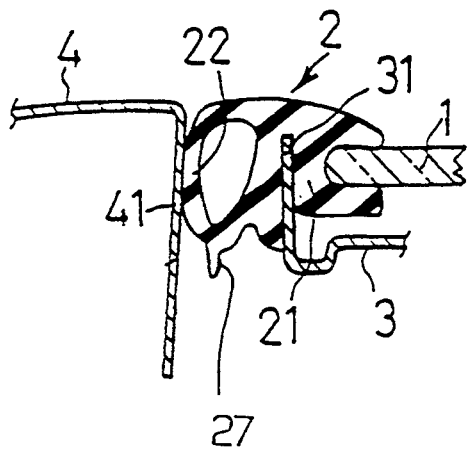
FIG. 3 is a cross-sectional view taken along the line III—III of FIG. 1.
Figure 4:
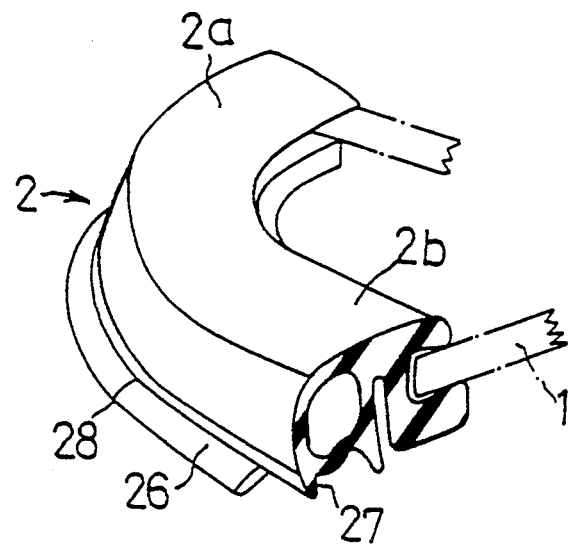
FIG. 4 is a perspective view of the portion C of FIG. 1.

The weather strip 2 has a seal lip 26 for preventing the generation of aspiration noise from its front portion 2a to its adjacent corner portions. The seal lip 26 has a uniform length so that its forward facing end reaches the frame portion 41 of the roof panel 4. The forward facing end thereof comes in pressure contact with the frame portion 41 of the roof panel 4 when the sun roof 1 is closed. A recess is formed at about the middle of the seal lip 26 to define a linearly extending thin-walled portion 28. The linearly extending thin-walled portion 28 divides the seal lip 26 into a base side portion that extends substantially vertically downwardly from the bottom of the tubular sealing portion 22 and a forward facing end portion that extends obliquely outward. In both side portions 2b, 2c and the rear portion 2d of the weather strip 2, a drip lip 27 has a length equal to that of the base side portion of the seal lip 26 and which is integral with the base side portion of the seal lip 26 is continuously formed as shown in FIG. 3. The drip lip 27 does not contact the frame portion 41 of the roof panel 4.

The weather strip having the above-described structure is made by forming a weather strip having a lip of a configuration identical to that of the seal lip 26 by the steps of extruding, slitting the lip from its forward facing end to its thin-walled portion 28 at ends of the above-described corner portions, and tearing the forward facing end along the thin-walled portion 28 except for the front and corner portions thereof.

In the weather strip 2 of the first embodiment, the seal lip 26 closely contacts the frame portion 41 of the roof panel 4 and has a large frictional force meant to resist the outward force on the sun roof when the motor vehicle is driven at high speeds. Accordingly, the front portion of the sun roof 1 is restrained from being drawn outward, and a sealing force of the weather strip against the frame portion 41 is prevented from being reduced, thereby preventing the generation of the aspiration noise.

In the side portions 2b, 2c and the rear portion 2d of the weather strip 2, the drip lip 27 guides water leaking through a gap between the sealing portion 22 and the frame portion 41 into a drip channel (not shown). The drip lip 27 of the side portions 2b, 2c does not contact with the frame portion 41, and accordingly does not resist the forward and rearward sliding movement of the sun roof 1.

The weather strip of the present embodiment can be easily extruded because the lips 26, 27 are composed of a continuous single lip. Moreover, the drip lip 27 of the side portions 2b, 2c and the rear portion 2d can be formed with improved productivity by merely tearing off the corresponding portion of the continuous single lip along the thin-walled portion 28.

Figure 5:
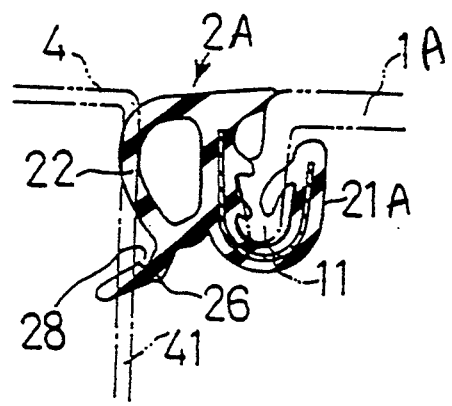
FIG. 5 is a cross-sectional view of a second embodiment of the weather strip, taken in the same region as FIG. 2.

FIG. 5 illustrates a second embodiment of the weather strip in accordance with the present invention. A base portion 21A of a weather strip 2A has a U-shaped cross-section. This base portion 21A holds a flange 11 formed around a sun roof 1A made of synthetic resin.

The structure and the operational effect of the remaining parts are substantially identical to those of the first embodiment.

Figure 6:
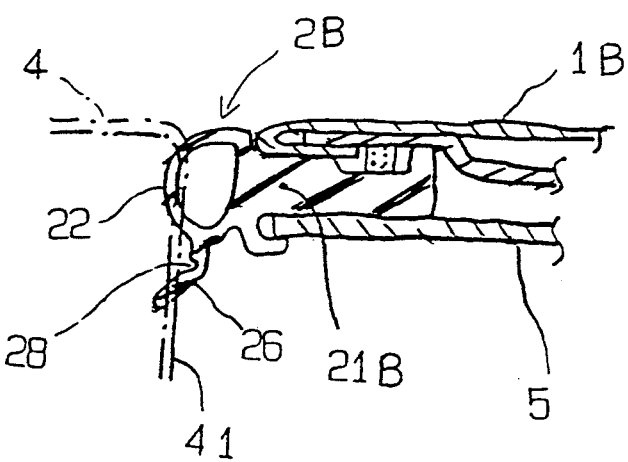
FIG. 6 is a cross-sectional view of a third embodiment of the weather strip, taken in the same region as FIG. 2.
Figure 7:
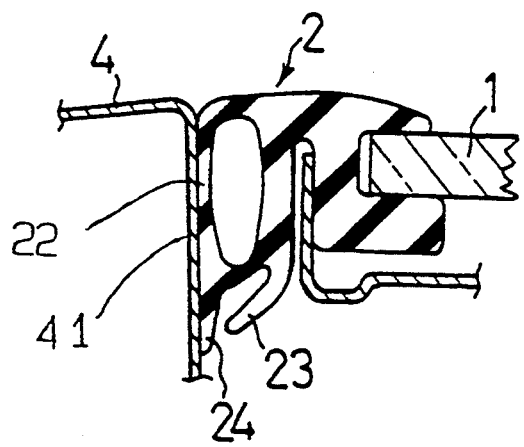
FIG. 7 is a cross-sectional view of prior art, taken in the same region as FIG. 2.
Figure 8:
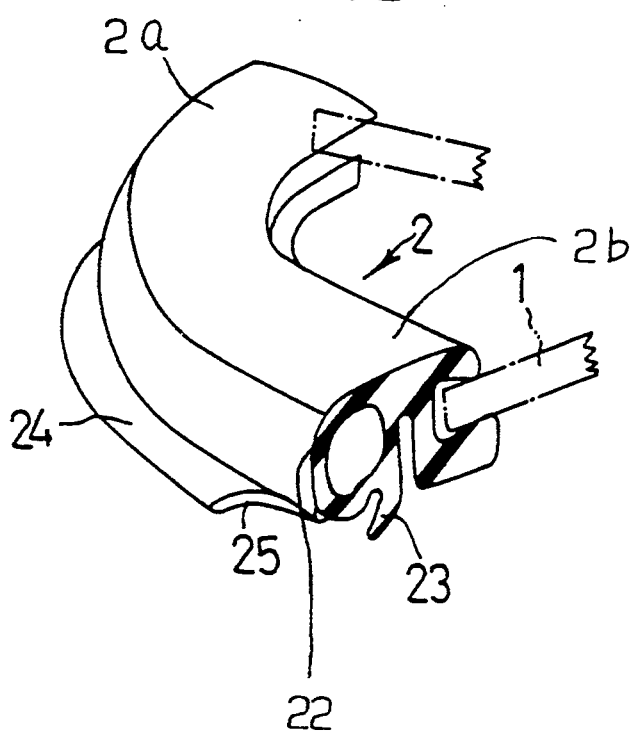
FIG. 8 is a perspective view of prior art, taken in the same region as FIG. 4.

FIG. 6 illustrates a third embodiment of the weather strip according to the present invention. A base portion 21B of a weather strip 2B takes the form of a thick plate. A holder member 5 is positioned below the periphery of a sun roof 1B. The weather strip 2B is attached to the sun roof 1B with its base portion 21B sandwiched between the periphery of the sun roof 1B and the holder member 5. The structure and the operational effect of the remaining parts are substantially identical to those of the first embodiment.

Figure 9:
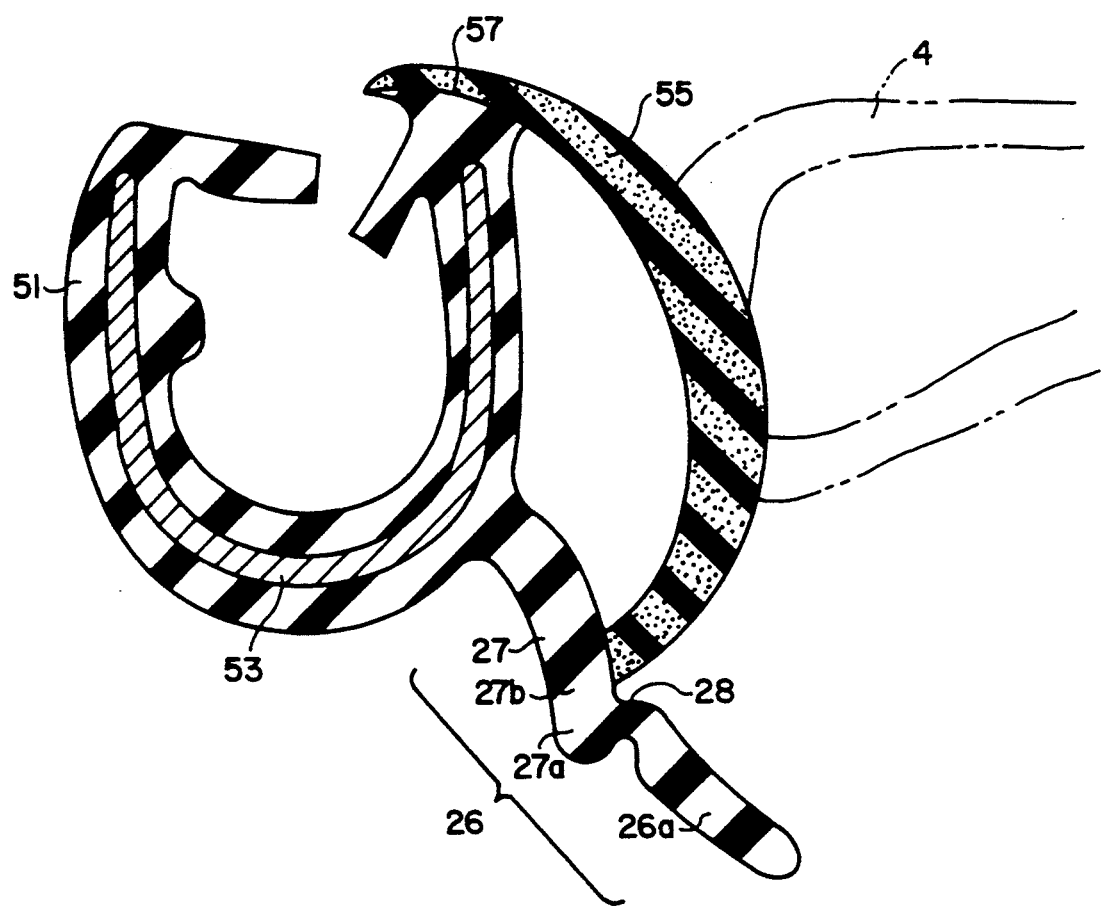
FIG. 9 is a cross sectional view of a fourth embodiment of the weather strip according to the present invention.

FIG. 9 depicts the fourth embodiment of the weather strip according to the present invention. This weather strip includes a substantially U-shaped base portion 51 having an insert 53 therein. The insert 53 provides added support and strength to the base portion and is preferably formed of metal. The upper end 57 of the base portion 51 is fitted with a sponge rubber sealing portion 55. The sponge rubber sealing portion 55 is deformable when the sealing portion 55 comes into pressure contact with a body panel 4 of the motor vehicle so that a tight seal may be formed. Seal lip 26 extends from the bottom of U-shaped base portion 51. Seal lip 26 includes a sloping section 27 extending substantially diagonally downwards from a base of the U-shaped base portion 51, with the sloping portion providing reinforcement for the sealing portion 55. The sealing portion 55 is joined with a lower end of the sloping section. A vertical section 27a extends substantially vertically downwardly from a lower end 27b of the sloping section. An outward facing end portion 26a extends from the vertical section 27a towards the motor vehicle for preventing the generation of aspiration noise. A thin-walled portion 28 is formed between the vertical section 27a and the outward facing end portion 26a for allowing the outward facing end portion 26a to be removed on the rear, right and left sides of the sun roof. The outward facing end portion 26a of the seal lip 26 is substantially the same length as the sloping section 27 combined with the vertical section 27a.

While the present invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A weather strip for attachment to a sun roof of a motor vehicle where the sun roof has a front, rear, right and left sides, which correspond to the front, rear, right and left sides of the motor vehicle respectively, said weather strip comprising:

a substantially U-shaped base portion for attachment to the front, rear, right and left sides of the sun roof;

a seal lip;

a sealing portion that deforms when in pressure contact with a body panel of the automobile, said sealing portion extending from a top end of said U-shaped base portion to said seal lip;

wherein said seal lip extends from a curved section of said U-shaped base portion, said seal lip including:

a base side portion comprising:

a sloping section extending substantially diagonally downwards from a base of said U-shaped base portion, said sloping section providing reinforcement for said sealing portion, said sealing portion being joined with a lower end of said sloping section, and a vertical section that extends substantially vertically downwardly from said lower end of said sloping section;

an outward facing end portion extending from the vertical section towards the motor vehicle for preventing the generation of aspiration noise; and a thin-walled portion formed between said vertical section of said base side portion and said outward facing end portion for allowing the outward facing end portion to be removed on the rear, right and left sides of the sun roof.

2. A weather strip as claimed in claim 1, wherein said base portion includes an interior insert that provides strength and support.

3. A weather strip for attachment to a vehicle sun roof having a front, rear, right and left sides comprising:

a substantially U-shaped base portion for attachment about the sun roof;

a sealing portion connected to said U-shaped base portion that deforms when in pressure contact with a body panel of the vehicle, said sealing portion extending from a top end of said U-shaped base portion and downwardly along one side thereof;

a sloping section extending substantially diagonally downwards from a bottom area of said U-shaped base portion, said sloping section providing a connection and reinforcement between the U-shaped base portion and said sealing portion;

a vertical section that extends substantially vertically downwardly from a junction formed between said sloping section and said sealing portion and terminates at an outer end; and a flap member extending outwardly from the weather strip, said flap member being connected to the outer end of said vertical section by a thin-walled joint.

* * * * *